United States Patent [19]

Kessinger, Jr.

[11] 4,278,151

[45] Jul. 14, 1981

[54] BRAKE ASSEMBLY FOR A VEHICLE

[75] Inventor: Orville E. Kessinger, Jr., Blue Grass, Iowa

[73] Assignee: Caterpillar Tractor Co., Peoria, Ill.

[21] Appl. No.: 104,234

[22] Filed: Dec. 17, 1979

Related U.S. Application Data

[63] Continuation-in-part of Ser. No. 815,113, Jul. 13, 1977, abandoned.

[51] Int. Cl.$^3$ ............................................. F16D 55/00
[52] U.S. Cl. ..................................... 188/71.3; 74/762; 74/710.5; 188/71.4; 188/106 P
[58] Field of Search ...................... 74/710.5, 762, 764, 74/720.5; 188/71.3, 71.1, 71.4, 106 P, 72.5, 72.4, 369, 370

[56] References Cited

U.S. PATENT DOCUMENTS

| | | | |
|---|---|---|---|
| 2,158,935 | 5/1939 | Gustafson | 192/13 |
| 2,323,052 | 6/1943 | Klaue | 188/71.4 X |
| 2,716,907 | 9/1956 | Beckman et al. | 74/720.5 |
| 2,762,460 | 9/1956 | Butler | 188/71.3 |
| 2,845,818 | 9/1959 | Siliander | 74/710.5 |
| 2,871,991 | 2/1959 | Burnett | 188/71.3 |
| 2,876,659 | 3/1959 | Richardson | 74/710.5 |
| 3,584,717 | 6/1971 | Suppes | 188/71.3 |
| 3,980,347 | 9/1976 | Griesenbrock | 188/71.4 |
| 4,064,974 | 12/1977 | Filderman | 188/72.5 |

FOREIGN PATENT DOCUMENTS

| | | |
|---|---|---|
| 801805 | 9/1958 | United Kingdom . |
| 812272 | 4/1959 | United Kingdom . |
| 818474 | 8/1959 | United Kingdom . |
| 1018556 | 1/1966 | United Kingdom . |
| 1176716 | 1/1970 | United Kingdom . |
| 1324659 | 7/1973 | United Kingdom . |

OTHER PUBLICATIONS

"International TD-24 Diesel Crowler", Aug. 1953.
"The International TD-24 Diesel with Planet Power Steering".
"International Planet-Powered TD-25 Torque Converter or Gear Drive", Mar. 1966.
"International TD-15B Series Power Shift", Apr. 1963.

*Primary Examiner*—Leslie Braun
*Attorney, Agent, or Firm*—Charles E. Lanchantin, Jr.

[57] ABSTRACT

A brake assembly for independently braking a pair of rotatably mounted spaced members (78,86) includes a main body (110) having a plate (112) and a C-shaped body portion (116) having first and second pluralities of bores (118,120) and first and second pluralities of pistons (122,124) in the bores. First and second C-shaped movable members (130,136) are connected to the opposite sides of the body portion (116) and are engagable against a respective one of the spaced members (78,86) in response to axial movement of the respective pistons (122,124). Advantageously, the main body (110) and the movable members (130,136) can be radially removed from a vehicle casing portion (16) independently of the spaced members (78,86).

2 Claims, 3 Drawing Figures

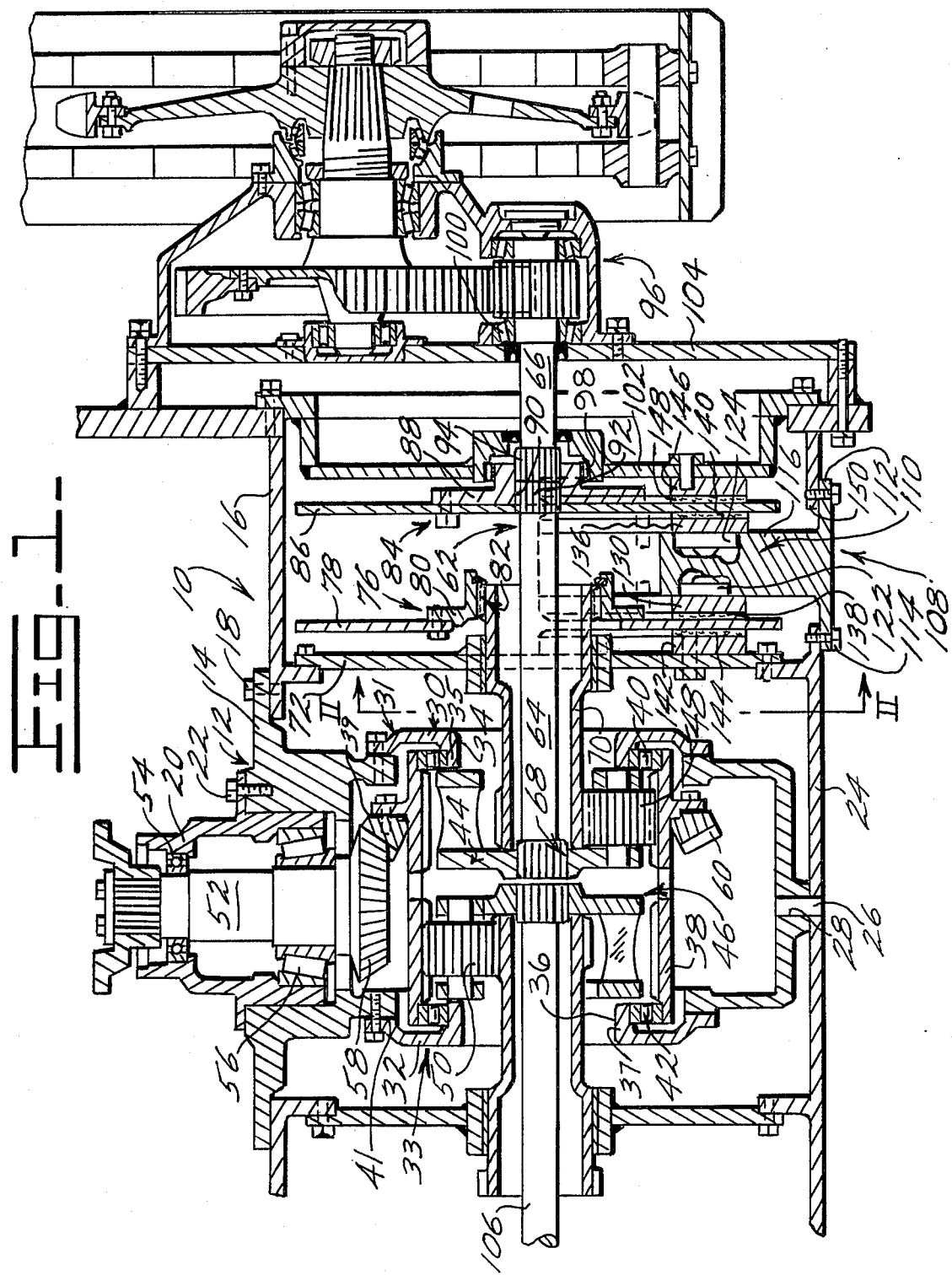

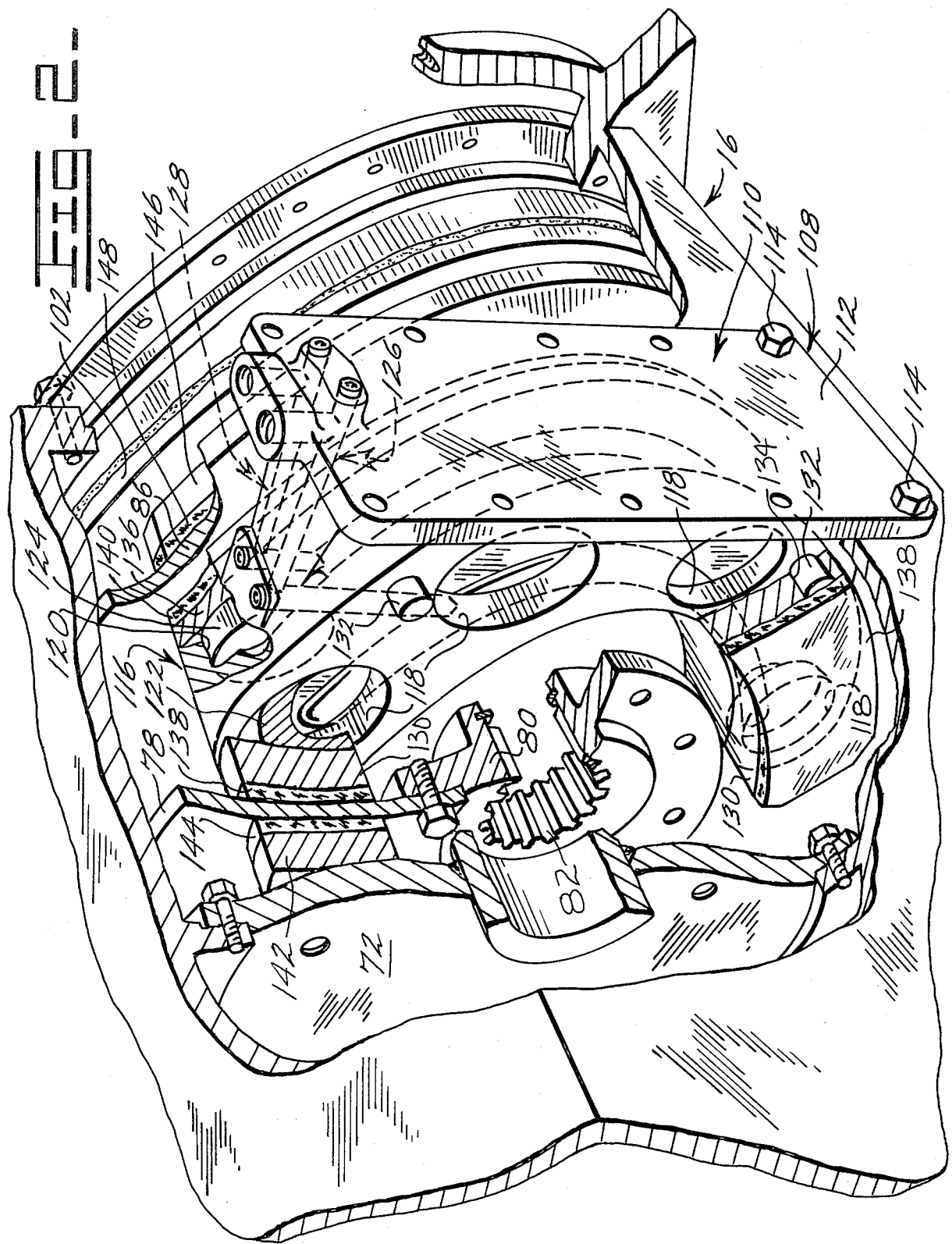

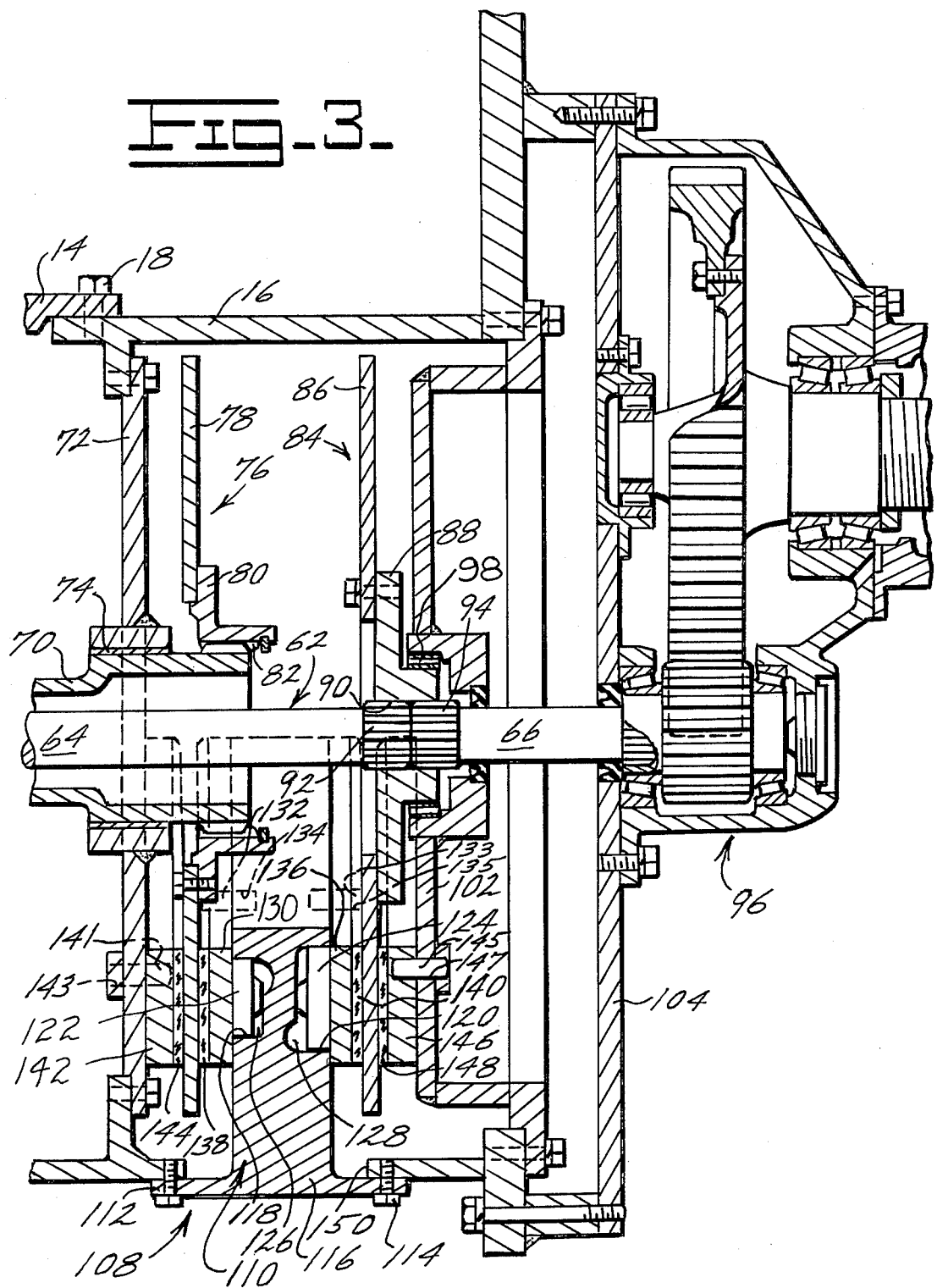

BRAKE ASSEMBLY FOR A VEHICLE

DESCRIPTION

CROSS-REFERENCE TO RELATED APPLICATION

This is a continuation-in-part application of Ser. No. 815,113 filed July 13, 1977, now abandon.

TECHNICAL FIELD

This invention relates to a brake assembly for a vehicle, and more particularly to a brake assembly for independently braking a pair of rotatable members and having convenient serviceability.

BACKGROUND ART

In a vehicle having driven tracks on the opposite sides thereof it is highly desirable to selectively provide power to one or both tracks, or to provide no power to either track, dependent on operating conditions. These features in combination with a braking system for each track, will provide a tracked-vehicle with high efficiency of operation. Not only is appropriate straight-line performance provided, but also highly efficient selective turning of the vehicle is obtained. Such steering is achieved through the selective relative releasing and holding of the individual clutch or brake discs located on the opposite sides of the vehicle.

Such relative holding is generally achieved through the movement of nonrotary friction material into engagement with a rotary member to thereby retard movement of that member. Additionally, nonrotary friction material may be appropriately positioned on the opposite side of that member to serve as a reaction. In this way the rotary member is contacted on both sides by portions of the friction material. Over a period of time, the friction material experiences considerable wear upon repeated engagement and disengagement of the brake system and must be replaced. Yet in the prior systems, the replacement of such friction material is not readily allowed for. For example, it is time consuming and difficult to remove the usual annular ring of friction material from the power train because almost complete disassembly thereof is required. The serviceability requirements are further complicated when it is desired to incorporate a single brake assembly for independently braking a pair of axially spaced members without having to remove the members during servicing of the brake assembly.

Moreover, it should be understood that each of the brake assemblies should be highly efficient, compact, and of relatively simple construction so as to be capable of convenient servicing.

The present invention is directed toward overcoming one or more of the problems as set forth above.

DISCLOSURE OF INVENTION

In accordance with one aspect of the present invention a brake assembly is provided for independently braking a pair of spaced members rotatably mounted within a vehicle casing portion. Advantageously the brake assembly includes a main body having a plate releasably connected to the casing portion and an inwardly extending C-shaped body portion having first and second pluralities of bores opening on the opposite sides thereof. First and second pluralities of pistons are individually disposed respectively in the first and second pluralities of bores, and first and second movable members individually having a C-shape are connected to the body portion on the opposite sides thereof. The first and second movable members are independently engagable against a respective one of the spaced members by movement of the respective first and second pluralities of pistons, and the main body and the first and second movable members are of a construction sufficient for radial release and removal from the casing portion from between the spaced members.

Thus, a compact brake assembly is provided for selectively and independently urging a pair of axially movable members into frictional engagement with a pair of rotatable members located in the cross drive of a tracked vehicle, for example. Specifically, the brake assembly is of such construction that a major portion thereof can be radially removed from the vehicle casing portion without any substantial disturbance of the pair of rotatable members.

BRIEF DESCRIPTION OF THE DRAWINGS

FIG. 1 is a fragmentary sectional view of a vehicle cross drive incorporating one embodiment of a brake assembly constructed in accordance with the present invention;

FIG. 2 is a perspective view, with portions broken away, taken generally along the line II—II of FIG. 1; and FIG. 3 is an enlarged sectional view of a portion of FIG. 1.

BEST MODE FOR CARRYING OUT THE INVENTION

Referring initially to FIG. 1, the apparatus includes a vehicle cross drive casing 10. Making up a part of the casing 10 is a rigid modular mounting frame assembly 12. The frame assembly 12 includes a main frame portion 14 removably securable to a casing portion 16 by means of bolts 18, and a generally tubular portion 20 secured to the main frame portion 14 by bolts 22. The main frame portion 14 extends to the opposite wall 24 of the casing 10, and is located there by a pin 26 secured to the casing 10 and extending into a bore 28 of the main frame portion 14.

Removably secured to opposite sides of the main frame portion 14 are annular retaining members 30, 32 defining respective openings 34, 36 therethrough. The retaining members 30, 32 define respective radial portions 31, 33 in turn defining axial portions 35, 37. A tubular ring gear 38 of generally uniform continuous circular cross-section is mounted by large roller bearings 40, 42 mounted on and about the axial portions 35, 37 and within the tubular ring gear 38, and retained fully within the mounting frame assembly 12. The ring gear 38 is thus rotatably mounted to and carried by the mounting frame assembly 12 with the axial portions 35, 37 extending within the tubular ring gear 38. Identical carriers 44, 46 are also included, the carrier 44 having rotatably mounted on shafts thereof planetary gears 48, and the carrier 46 likewise having rotatably mounted on shafts thereof planetary gears 50 identical to planetary gears 48. Each of the planetary gears 48, 50 is in engagement with the ring gear 38. The carriers 44, 46 and planetary gears 48, 50 are fully positioned within the ring gear 38, and because of the configuration and positioning of the annular retaining members 30, 32 radial portions 31, 33, and in particular the axial portions 35, 37 thereof, are retained fully within the ring gear 38.

Shims may be provided as appropriate at 39, 41 to determine proper positioning of the retaining members 30, 32.

An input pinion shaft 52 is rotatably mounted to the mounting frame assembly 12, being positioned through the generally tubular portion 20, and rotatably supported by bearings 54, 56 mounted within the generally tubular portion 20. A pinion gear 58 is fitted to the inward end of the input pinion shaft 52 within the mounting frame assembly 12, and in engagement with a bevel gear 60 directly fixed to the ring gear 38, surrounding such ring gear 38 and positioned about the outer surface thereof.

With the rigid mounting frame assembly 12 positioned as shown in FIG. 1, i.e., secured to the casing portion 16, the outer overall surface of the mounting frame assembly 12 defines a portion of the outer surface of the overall casing 10. Because of this, the overall modular unit including the mounting frame assembly and structure thus far described is readily accessible from outside the casing 10 as a unit.

A drive shaft 62, made up of two drive shaft parts 64, 66 in abutting contact, is included. The carrier 44 is secured from rotation relative to the inner end of the drive shaft 62 by means of a splined connection 68. A generally tubular sun gear 70 is disposed about the drive shaft 62, and is rotatably mounted in a partition wall 72 of the casing 10 by means of bearing 74. The sun gear 70 is rotatable relative to the carrier 44, and extends within the planetary gears 48 and in engagement with each of the planetary gears.

A disc assembly 76 includes a rotary member or disc 78 and a hub 80 to which the disc 78 is secured. The disc assembly 76 is secured by a splined connection 82 to the sun gear 70 to rotate as a unit. The disc 78 is positionally removed from the ring gear 38, with the disc 78 and ring gear 38 being on opposite sides of the partition wall 72, the shaft 62 being disposed through the partition wall.

Another disc assembly 84 includes a second rotary member or disc 86 and a hub 88 to which the disc 86 is secured, the hub 88 including internal splines 90 which engage with splined adjacent ends 92, 94 of the shaft parts 64, 66 the hub 88 thereby drivingly connecting the shaft parts 64, 66 with the disc 86 secured from rotation relative to the overall drive shaft 62. The disc 78 is disposed in the area generally between the carrier 44 and the disc 86.

The extended end of the drive shaft 62 is in driving relation with a vehicle output drive 96, the shaft part 66 and thus the overall shaft 62 being rotatably supported by bearings 98, 100 in respective walls 102, 104 of casing 10.

A second drive shaft 106 identical to the drive shaft 62 but reversed in position relative thereto, is operatively associated with the carrier 46 in the same manner as the association of drive shaft 62 with carrier 44. The inner ends of the drive shafts 62, 106 are in adjacent, generally end-to-end relation, positioned within the ring gear 38. Also operatively associated with the drive shaft 106, but reversed in position, are a similar sun gear and disc assembly, in the same manner as previously described.

The discs 78, 86 have also associated therewith brake assembly means for selectively securing each of such discs from rotative movement relative to the casing 10, and for allowing rotative movement of each of the discs relative to the casing. Similar means (not shown) are associated with the discs operatively associated with the drive shaft 106, and the operation of such means are identical to the means shown in FIGS. 1 and 3. Thus, only the construction and operation of the means operatively associated with the discs 78, 86 as shown will be described in detail.

The brake assembly means includes an actuator head assembly 108 having a main body 110 including a plate 112 which may be removably secured to the casing portion 16 by bolts 114. The plate 112 thereby makes up a portion of the overall casing 10, and it will be seen that the main body 110 is readily accessible from outside the casing 10 so as to be readily removable therefrom, a surface of the plate 112 actually defining a portion of the outer surface of the casing 10 with the plate so secured to the casing portion 16. The main body 110 also includes an elongated, curved main body portion 116 (FIG. 2) defining a plurality of bores 118 on one side thereof and a plurality of bores 120 on the opposite side thereof. A plurality of pistons 122 are movably disposed in the bores 118, and a plurality of pistons 124 are movably disposed in the bores 120. The bores 118 communicate with passage means 126 defined by the main body 110, into which pressureized fluid may be introduced, thereby forcing the pistons 122 outwardly of the main body 110. The bores 120 likewise communicate with passage means 128 defined by the main body 110, into which pressurized fluid may be introduced to force the pistons 124 outwardly of the body 110, in a direction opposite the movement of the pistons 122.

An elongated, curved movable member 130 (shown in FIG. 2), is positioned along one side of the main C-shaped body portion 116. A plurality of pins 132 project from the main body portion 116, disposed in respective bores 134 defined by the movable member 130, for guiding movement of the movable member 130 relative to the main body portion 116 (see also FIGS. 1 and 3). Similar pins 133 and bores 135 associate another movable member 136 of similar C-shaped configuration with the opposite side of the main body portion 116. The pistons 122 are positioned along the length of the movable member 130 at generally equal intervals, as are the pistons 124 along the member 136. The movable member 130 has bonded thereto friction material 138 of the generally same overall shape as such movable member 130, and the movable member 136 has similar friction materials 140 bonded thereto. The friction materials 138, 140 face in opposite outward directions relative to the main body 110 on either side thereof.

The wall 72 has removably mounted thereto by similar pins 141 and bores 143, a reaction plate 142, the plate 142 and wall 72 making up reaction means positioned on the side of the disc 78 opposite the movable member 130. The plate 142 is also elongated and curved in configuration, generally corresponding to the shape of the movable member 130. Friction material 144 corresponding to the shape of the plate 142 is bonded to the plate 142 immediately adjacent the disc 78, on the opposite side thereof from the friction material 138, such friction material 144 being immediately adjacent the disc 78. The wall 102 of the casing 10 has removably mounted thereto by means of like pins 145 and bores 147 a similarly configured reaction plate 146, the reaction plate 146 having bonded thereto friction material 148. The wall 102 and plate 146 make up reaction means on the side of the disc 86 opposite the movable member 136. Thus, the movable member 136 and plate 146 are positioned on opposite sides of the disc 86, with the friction material 140 and friction material 148 also being on opposite sides of the disc 86 immediately adjacent thereto.

It will be seen that upon introduction of pressurized fluid into the passage means 126, the pistons 122 extend from the main body portion 116, each of the pistons 122 contacting the movable member 130 to bring the friction material 138 thereon into engagement with the disc 78. The disc 78 is movable to an extent along the sun gear 70 (and thus relative to the shaft 62) by means of the splined connection between the hub 80 and sun gears 70. The disc 78 is thereby gripped to an extent between the friction material 138 and friction material 144. The disc 86 is also movable along the shaft 62 through the splined connection, and similarly introduction of pressurized fluid into the passage means 128 forces the pistons 124 outwardly of the body portion 116, to force the friction material 140 against the disc 86, the disc 86 moving along the shaft 62 to an extent so that the disc 86 may be gripped between the friction material 140 and friction material 148. The main body portion 116 is thus positioned between the discs 78, 86, and the force is applied by the apparatus in outward, opposite directions against the spaced discs 78, 86. It will be understood that pressure supplied to the passage means 126 and to the passage means 128 may be varied so as to vary the extent of holding of either of the discs 78, 86 relative to the casing 10.

It will be realized that similar apparatus is operatively associated with the discs in turn operatively connected with drive shaft 106. The operation of that portion of the apparatus shown in FIGS. 1 and 3 will now be described, it being understood that the operation of the drive shaft 106 and associated structure is similar thereto.

If it is desired that the output drive means 96 of the vehicle be driven, pressurized fluid is supplied to passage means 126 so that the disc 78 is held from rotation relative to the casing 10, while pressure is released from passage means 128 allowing the disc 86 to rotate with the drive shaft 62 relative to the casing 10. In such state, power applied to the shaft 52 will rotate the pinion and bevel gears 58, 60 to rotate the ring gear 38 through such direct connection, such rotation of the ring gear 38 rotating the planetary gears 48 about the held-in-position sun gear 70. Rotation of the planetary gears 48 rotates the carrier 44 to in turn rotate the drive shaft 62 through the splined connection 68, rotation of the drive shaft 62 providing drive of the output drive means 96. Because of the particular configuration of the apparatus as thus far described, the disc 78 is subjected to less driving torque than the drive shaft 62 of the apparatus. If vehicle braking is desired, pressurized fluid is applied into passage means 128 while releasing disc 78 to provide gripping of the disc 86 between the friction material 140 and friction material 148. Since such disc 86 is connected to the shaft by a splined connection, the gripping of the disc 86 provides direct retardation of movement of the drive shaft 62 to in turn slow down the vehicle drive means 96. To achieve a neutral state, pressure is released from the passage means 126 and from the passage means 128 so that no gripping of the disc 78 or the disc 86 takes place. In such case, the ring gear 38 will be rotated as before, and such rotation will then rotate the sun gear 70 and discs operatively associated therewith, rather than the carrier 44, since rotation of the carrier 44 is resisted by the weight of the vehicle. Because of the particular construction of the ring gear 38, planetary gears 48 and sun gear 70, a maximum gearing reduction is achieved in a very small volume. It should be noted that the gripping force applied to disc 78 is taken by pins 132, 141, while the gripping force applied to disc 86 is taken by pins 133, 145.

In any case, because of the movement of disc 78 or disc 86 along shaft 62, through the described splined connections, it is insured that even though friction material or the disc itself, is in a worn state, proper gripping of these discs takes place, because each disc will be "centered" between the friction material acting thereon.

It will be understood that the shaft 106 and apparatus associated therewith operate in an identical manner.

Because the shafts 62, 106 are quite long, a greater tolerance in lining up shaft support points is allowed, without the risk of cocking such shafts 62, 106 at an undesirable angle.

Because of the ready accessibility of the main body 110, such assembly of main body 110, pistons 122, 124, movable members 130, 136 and friction material 138, 140 may be easily removed from the casing portion 16 by means of an access hole 150 of the casing portion 16 properly dimensioned to allow such easy removal therethrough. With the assembly including those parts removed from the casing portion 16, the members 130, 136 with friction material 138 and friction material 140 thereon, may be easily replaced as necessary. With the assembly so removed, it will also be seen that the disc 78 may be moved rightward along the sun gear 70 and drive shaft 62 because of the splined connection 82, and a person may then easily reach into the area leftward of the disc 78, so as to gain access to the plate 142 and friction material 144, for removal and replacement thereof.

After replacement of such friction material as appropriate, such assembly may then be easily and conveniently replaced into the position shown in FIGS. 1 and 3. It will therefore be seen that the friction materials of the overall apparatus may be serviced in a highly efficient and convenient manner, with it being insured that proper operation of the overall apparatus as fully assembled takes place.

With the apparatus as shown in FIGS. 1 and 3, it should be noted that the disc 78 is in close proximity to the bearing 74, while the disc 86 is in close proximity to the bearing 98. Thus, the bearings 74, 98 are appropriately positioned so as to minimize bending of the shaft 62 during gripping of the disc 78 and disc 86.

It should also be noted that with the drive shaft 62, 106 moved to outward positions through disconnection thereof from the vehicle output drive means, so as to be completely removed from within the mounting frame assembly 12, the sun gears as at 70 may also be moved outwardly of the mounting frame assembly 12 so as to be completely removed from therewithin. The bolts 18 holding the main frame portion 14 onto the casing portion 16 may be removed, and the entire mounting frame assembly including main frame portion 14, annular retaining members 30, 32, generally tubular portion 20, input drive shaft 52, pinion gear 58, bevel gear 60, ring gear 38, carriers 44, 46 and planetary gears 48, 50 may be removed from the casing portion 16 and may be handled in a convenient manner.

Other aspects, objects and advantages of this invention can be obtained from a study of the drawings, the disclosure and the appended claims.

What is claimed is:

1. A brake assembly for independently braking a pair of spaced members (78,86) rotatably mounted within a vehicle casing portion (16) on an axis, the casing portion (16) having an access opening (150), the brake assembly comprising:
   - a main body (110) having a plate (112) and a C-shaped body portion (116) having first and second pluralities of bores (118,120) opening on the opposite sides thereof, the plate (112) being releasably connected to the casing portion (16) and the body portion (116) extending inwardly through the access opening (150);
   - first and second pluralities of pistons (122,124) individually disposed respectively in the first and second pluralities of bores (118,120);
   - a first movable member (130) having a C-shape connected to the body portion (116) on one side thereof; and
   - a second movable member (136) having a C-shape connected to the body portion (116) on another side thereof, the first and second movable members (130,136) being independently engagable against a respective one of the spaced members (78,86) by axial movement of the respective first and second pluralities of pistons (122,124), and the main body (110) and the first and second movable members (130,136) being of a construction sufficient for release and removal from the casing portion (16) in a direction radially away from the axis between the spaced members (78,86) and independently of the spaced members (78,86).

2. The brake assembly of claim 1 including first and second pluralities of pins (132,133) extending axially from the opposite sides of the body portion (116), the first and second movable members (130,136) being individually mounted on the first and second pluralities of pins (132,133).

* * * * *